US005830989A

United States Patent [19]
Cooley et al.

[11] Patent Number: 5,830,989
[45] Date of Patent: Nov. 3, 1998

[54] CATALYST COMPOSITION

[75] Inventors: Neil Andrew Cooley, Middlesex; Philip Kenneth Gordon Hodgson; Philip Geoffrey Lodge, both of Surrey; John Paul McNally, Berkshire, all of England

[73] Assignee: BP Chemicals Limited, London, England

[21] Appl. No.: 532,487

[22] Filed: Sep. 22, 1995

[30] Foreign Application Priority Data

Sep. 30, 1994 [GB] United Kingdom ............ 9419762

[51] Int. Cl.$^6$ ................................. C08G 67/02
[52] U.S. Cl. ............................................. 528/392
[58] Field of Search ................................ 528/392

[56] References Cited

U.S. PATENT DOCUMENTS

| | | |
|---|---|---|
| 4,822,871 | 4/1989 | Klingensmith . |
| 5,143,873 | 9/1992 | Bryndza et al. . |
| 5,145,823 | 9/1992 | VanLeeuwen et al. . |
| 5,468,708 | 11/1995 | Cooley et al. . |

FOREIGN PATENT DOCUMENTS

| | | |
|---|---|---|
| 121965 | 10/1984 | European Pat. Off. . |
| 146683 | 11/1987 | European Pat. Off. . |
| 314309 | 5/1989 | European Pat. Off. . |
| 501576 | 9/1992 | European Pat. Off. . |
| 508502 | 10/1992 | European Pat. Off. . |
| 619335 | 10/1994 | European Pat. Off. . |

Primary Examiner—Melvyn I. Marquis
Assistant Examiner—D. Aylward
Attorney, Agent, or Firm—Fay, Sharpe, Beall, Fagan, Minnich & McKee

[57] ABSTRACT

A catalyst composition for preparing polyketones comprises (a) a Group VIII metal compound, containing at least one ligand capable of coordinating to the Group VIII metal and, (b) a compound of the formula BXYZ where at least one of X, Y and Z is a chloro or bromophenyl group preferably $B(p\text{-ClC}_6H_4)_3$. Polyketones having p-chlorophenyl or p-bromophenyl end groups are also disclosed.

3 Claims, No Drawings

CATALYST COMPOSITION

The present invention relates to novel catalyst compositions suitable for use in preparing polyketones.

It is known to produce polyketones, which are linear alternating polymers of (a) one or more olefins and (b) carbon monoxide, by a liquid phase process in which the olefin(s) and carbon monoxide are polymerised together in methanol, ethanol or propanol solvent in the presence of a palladium catalyst. Such a process, which is disclosed in more detail in for example EP 121965 and EP 314309, typically employs a catalyst derived from (a) a palladium compound (b) a source of an anion which is either non-coordinating or only weakly coordinating to palladium and (c) a bisphosphine of formula $R^1R^2P-R-PR^3R^4$ where $R^1$ to $R^4$ are independently aryl groups which can optionally be polar substituted and R is a divalent organic bridging group such as $—(CH_2)_n—$ (n=2 to 6). The source of the anion is typically its conjugate acid.

It is furthermore known from EP-A-246683 that polyketones can also be prepared if component (b) in the catalyst is replaced by tin chloride or germanium chloride. Such salts of a strong acid and a weak base are electron acceptors, and thus "Lewis" acids.

EP-A-508502 discloses catalyst compositions comprising:
a) a Group VIII metal compound,
b) a Lewis acid of the general formula $MF_n$ in which M represents an element that can form a Lewis acid with fluorine, F represents fluorine and n has the value 3 or 5, and
c) a dentate ligand containing at least two phosphorus-, nitrogen- or sulphur-containing dentate groups through which the dentate ligand can complex with the Group VIII metal.

A problem with the prior art catalyst compositions is to improve their reaction rate.

It has now been found that high reaction rates can be obtained using catalyst compositions based upon Group VIII metal compounds in conjunction with specific boron compounds.

According to the present invention there is provided a catalyst composition for preparing polyketones comprising:

(a) a Group VIII metal compound, containing at least one ligand capable of coordinating to the Group VIII metal and (b) a compound of the formula BXYZ where at least one of X Y and Z is a chloro- or bromo-phenyl group.

A further advantage of the present invention is the ability to significantly reduce or totally eliminate the need to use protonic acids especially those having a low pKa e.g. less than 2 although small quantities of water can be tolerated. It is thought that if residual quantities of such acids are retained in the polyketone, the thermal stability of the polyketone is reduced.

The term polyketone is used herein to mean an interpolymer of one or more olefins with carbon monoxide. The idealised structure of such a material would be a polymer of strictly alternating olefin and carbon monoxide units. Although polyketones prepared according to the present invention correspond to this idealised structure, it is envisaged that materials corresponding to this structure in the main but containing small regimes (i.e. up to 10 wt %) of the corresponding polyolefin also fall within the definition.

Considering next the feedstocks for the polymerisation, it is believed that any source of carbon monoxide can be used. Thus the carbon monoxide may contain nitrogen, inert gases and hydrogen.

Any olefin can in theory be used although the best reaction rates are obtained when either ethylene or a mixture of olefins which include ethylene, e.g. ethylene/propylene, ethylene/butylene, ethylene/hexene and the like, is used. The lower rates obtained in the absence of ethylene should not be construed as indicating that the process can be used only with any ethylene feedstock since other olefins such as propylene, 4-methylpentene-1, styrene, acrylates, vinyl acetates and the like all undergo reaction to some extent.

The catalyst compositions of the present invention comprise a Group VIII metal compound. The Group VIII metals are iron, cobalt, nickel, ruthenium, rhodium, palladium, osmium, iridium and platinum. Palladium is particularly preferred as the Group VIII metal.

The Group VIII metal compound also contains at least one ligand capable of co-ordinating to the Group VIII metal. Examples of such ligands are phosphorus-, arsenic-, antimony-, nitrogen-, and sulphur-donor ligands, preferably phosphorus-donor ligands e.g. phosphines, phosphinites, phosphonites or phosphites, preferably phosphines. Where phosphines are used, these can be mono-dentate or bidentate. Useful monodentate ligands are of the formula $PR_1R_2R_3$ where $R_1$, $R_2$ and $R_3$ are independently an optionally substituted alkyl or aryl group e.g. $C_1$–$C_6$ alkyl, phenyl, anisyl, tolyl. It is preferred that $R_1=R_2=R_3$; preferred monodentate phosphines are $PPh_3$, $PMe_3$, $PEt_3$ and $P(n-Bu)_3$. Alternatively bidentate phosphines can be used especially phosphines of the formula $R_4R_5P-R_8-PR_6R_7$ where $R_4$, $R_5$, $R_6$ and $R_7$ may be the same or different and all have the same definition as the groups $R_1$, $R_2$, $R_3$, and $R_8$ is a divalent organic group such as $—(CH_2)_n—$ where n=2 to 6. Examples of such bidentate phosphines are 1,3-bis (diphenylphosphino)propane (dppp); 1,2-bis (diphenylphosphino) ethane (dppe); 1,4-bis (diphenylphosphino)butane (dppb) and 1,3-bis[di(o-methoxyphenyl)phosphino]propane (dapp).

The Group VIII metal compound containing such a ligand can be added to the reaction medium either in a preformed state or it can be generated in situ by adding a Group VIII metal precursor and the ligand separately, preferably simultaneously.

In addition to the ligand capable of co-ordinating to the Group VIII metal, the Group VIII metal compound will preferably comprise other groups or ligands bonded to the Group VIII metal; these groups or ligands may or may not derive from any Group VIII metal precursors that have been used in generating the Group VIII metal compound. Such groups or ligands are suitably halides, especially chloride; acetate, trifluoroacetate, tosylate, nitrate, sulphate, acetylacetonate, cyanide, preferably acetate or labile ligands e.g. trifluoroacetate, tosylate, nitriles, solvent molecules e.g. water, acetone. The Group VIII metal compound can suitably be a neutral or cationic compound preferably cationic for example a dicationic compound e.g. $[Pd(PP)L_2](A)_2$ where PP is a bidentate phosphine, L is a labile donor ligand e.g. benzonitrile, acetonitrile, water, acetone and A is a weakly or non-coordinating anion or $(A)_2$ together can be a weakly or non-coordinating dianion; a suitable dicationic compound is $[Pd(dppp)(PhCN)_2](BF_4)_2$.

In addition to the Group VIII metal compound, the catalyst compositions of the present invention also comprise a boron compound of the formula BXYZ where at least one of X Y and Z is a chloro- or bromo-phenyl group. Where any one of X Y or Z is not a chloro or bromo-phenyl group, it is suitably a substituted or unsubstituted alkyl for example a $C_1$–$C_6$ alkyl group, $CF_3$ or $C_2F_5$, or an aryl group for example a substituted or unsubstituted phenyl group, for example $C_6H_5$, $C_6F_5$, $(CF_3)C_6H_4$ or m,m-$C_6H_3(CF_3)_2$, or a OH, OR (where R is a hydrocarbyl group) or halide group for example fluoride, chloride or bromide. It is to be understood that two of the groups X, Y and Z can together form a bivalent group. At least one of X, Y and Z is a chloro or bromophenyl group; however, it is preferred that at least two, preferably three, of X, Y and Z are chloro or bromophenyl groups. It is preferred that where the chloro or bromo phenyl group is a mono chloro or mono bromo phenyl group, the chloro or bromo group is in the para or ortho position, more preferably the para position. Suitable examples of such compounds are $B(p-ClC_6H_4)_3$ and $B(p-BrC_6H_4)_3$ preferably $B(p-ClC_6H_4)_3$.

The boron compound BXYZ is added to the reaction medium in an amount such that the Group VIII metal: Boron ratio is in the range 10:1 to 1:200 preferably 1:1 to 1:100 more preferably 1:5 to 1:70 e.g. about 1:20.

The catalyst compositions can be used in either the gas-phase or the liquid phase. It is to be understood that the term liquid phase also includes slurry-phase where the polyketone product is insoluble in the reaction solvent. Where the catalyst compositions are used in the liquid phase, any suitable solvent can be used. Examples of such solvents are ketones (e.g. acetone), ethers, glycol ethers, chlorinated solvents (e.g. chloroform, dichloromethane), hydrocarbon solvents (e.g. cyclohexane, toluene), methanol and ethanol. A particularly preferred solvent is any olefinically-unsaturated hydrocarbon especially where such a hydrocarbon is also a reactant in the polymerisation reaction. Examples of such olefinically-unsaturated hydrocarbons are $C_3$–$C_{10}$ olefins (preferably $C_3$–$C_6$ olefins e.g. propylene, n-butene, isobutene, and n-hexene) and styrene. A preferred olefinically-unsaturated olefin as solvent is propylene. It is a feature of the present invention that non-alcoholic solvent systems can be used where necessary. Alcohol impurities in the final polymer can be undesirable where the polymer is to be used for food packaging since alcohols are usually toxic. The solvents may contain small quantities of water for example up to about 0.5% wt/wt. Where the reaction is carried out in the gas phase, small quantities of water may be added. Where water is present, it is preferably present in an amount of at least 4 moles per mole atom of boron.

The scope of the present invention encompasses a process for preparing polyketones comprising contacting carbon monoxide with one or more olefins in the presence of a catalyst as described herein above.

The polymerisation process is suitably carried out at a temperature in the range 20° to 150° C. preferably 50° to 120° C. and at elevated pressure, (e.g. 1 to 100 barg). The over pressure of gas is suitably carbon monoxide or carbon monoxide and olefin, if the olefin is gaseous under the reaction conditions. It is possible to operate the polymerisation process either batchwise or continuously.

In a further aspect of the present invention there is provided a polyketone wherein at least 30, preferably at least 40 more preferably about 50 mole % of the end groups are chloro- or bromophenyl groups.

The following Examples illustrate the present invention.

EXPERIMENTAL

Methanol was distilled from magnesium methoxide, diethyl ether was distilled from sodium/benzophenone ketyl and dichloromethane was dried over calcium hydride. Tetrahydrofuran (Aldrich hplc grade) and methanol-d (Aldrich) were used as supplied. Complexes were synthesised under a nitrogen atmosphere using standard techniques for the manipulation of air sensitive compounds. [$Pd(COD)Cl_2$] was synthesised according to the method described by Chatt et al in J.Chem.Soc. 1957 3413.

$Pd(dppp)Cl_2$ 1,3-bis(diphenylphosphino)propane (0.948 g, 2.30 mmol) was added to a stirred suspension of $Pd(COD)Cl_2$ (0.652 g, 2.29 mmol) in dichloromethane (25 cm$^3$). After stirring for 10 min diethyl ether (250 cm$^3$) was added and stirring was continued for a further 30 min. The product was collected by filtration, washed with diethyl ether and dried in vacuo to give $Pd(dppp)Cl_2$ (1.321 g, 2.24 mmol) as off white/cream microcrystals. Yield 98%.

$Pd(dapp)Cl_2$ $Pd(dapp)Cl_2$ was synthesised by the same method as used in the synthesis of $Pd(dppp)Cl_2$ except that dapp was used instead of dppp.

$[Pd(dppp)(PhCN)_2][BF_4]_2$

Silver tetrafluoroborate (0.792 g, 4.07 mmol) was weighed directly into a Schlenk tube. A half-equivalent of $Pd(dppp)Cl_2$ (1.1890 g, 2.02 minol) was added, followed by benzonitrile (10 cm$^3$) and dichloromethane (40 cm$^3$). After stirring for 1hr, the pale yellow solution was filtered. Addition of diethylether (120 cm$^3$) caused a thick white precipitate to form. The product was collected by filtration, and washed with diethyl ether (40 cm$^3$). After drying in vacuo, $[Pd(dppp)(PhCN)_2][BF_4]_2$ (1.58 g, 1.76 mmol) was obtained as a white powder.

Yield 87%;

$[Pd(dapp)(PhCN)_2][BF_4]_2$

Treatment of a $CH_2Cl_2$ solution (20 cm$^3$) of [Pd(dapp)$Cl_2$] (0.30 gm, 0.42 mmol) with $AgBF_4$ (0.168 gm, 0.840 mmol) in the presence of PhCN (0.427 gm, 4.20 mmol) immediately afforded a straw yellow solution and an off white pptd, presumably AgCl, which rapidly darkened. The solution was separated from the mixture via filter cannular and the solvent removed in vacuo leaving a yellow residue. Recrystallisation of the product from a $CH_2Cl_2/Et_2O$ mixture (20 cm$^3$, 1:9) yielded the salt $[Pd(dapp)(PhCN)_2][BF_4]_2$ as yellow microcrystals (0.27 gm, 0.27 mmol, Yield 64%).

Example 1

Tris (p-chlorophenyl)boron, (0.1 108, 0.32 mmol) was dissolved in degassed dichloromethane (100 cm$^3$) and transferred to a 300 cm$^3$ Autoclave Engineers reactor under nitrogen. Propene (25.6 g, 0.61 mol) was introduced into the autoclave. The stirred reactor contents were pressured to 40 barg with a 1:1 mixture of carbon monoxide and ethylene and heated to 70° C. A solution of $[Pd(dppp)(PhCN)_2][BF_4]_2$ (0.0151 g, 0.017 mmol) in degassed dichloromethane (10 cm$^3$) was introduced into the reactor and the pressure was adjusted to 50 barg by addition of 1:1 $CO/C_2H_4$. During the subsequent reaction, a pressure of 50 barg was maintained by the addition of 1:1 $CO/C_2H_4$. Three hours after the addition of the palladium, the reaction was stopped by cooling the mixture and venting the gaseous components. The alternating ethene/propene/CO polymer was collected by filtration and dried in vacuo. Yield=30.65 g, Productivity=5713 g gPd-1 h-1.

Examples 2–5 were carried out as described in Example 1. The results are set out in Table 1. The catalyst and co-catalyst for each example are also set out in Table 1.

TABLE 1

| Example No. | Catalyst | Co-catalyst | Reaction Time (h) | T (°C.) | Yield (g) | Productivity (ggPd$^{-1}$h$^{-1}$) | IV (dlg$^{-1}$)* |
|---|---|---|---|---|---|---|---|
| 1 | [Pd(dppp)(PhCN)$_2$][BF$_4$]$_2$ (0.0151 g, 0.017 mmol) | B(p-ClC$_6$H$_4$)$_3$ (0.1108 g, 0.32 mmol) | 3.0 | 70 | 30.65 | 5713 | 1.54 |
| 2 | [Pd(dppp)(PhCN)$_2$]][BF$_4$]$_2$ (0.0156 g, 0.017 mmol) | B(C$_6$F$_5$)$_3$ (0.1608 g, 0.31 mmol) | 3.0 | 70 | 39.25 | 7081 | 1.40 |
| 3 | [Pd(dppp)(PhCN)$_2$][BF$_4$]$_2$ (0.0154 g, 0.017 mmol) | B(C$_6$H$_5$)$_3$ (0.0748 g, 0.31 mmol) | 4.3 | 70 | 23.43 | 3023 | 1.39 |
| 4 | [Pd(dapp)(PhCN)$_2$][BF$_4$]$_2$ (0.0170 g, 0.017 mmol) | B(C$_6$F$_5$)$_3$ (0.1583 g, 0.31 mmol) | 3.3 | 85 | 8.82 | 1513 | 1.29 |
| 5 | [Pd(dapp)(PhCN)$_2$][BF$_4$]$_2$ (0.0170 g, 0.017 mmol) | B(p-ClC$_6$H$_4$)$_3$ (0.1129 g, 0.33 mmol) | 2.0 | 85 | 25.382 | 7145 | 1.54 | dppp = 1,3-bis(diphenylphosphino)propane
dapp = 1,3-bis(di(o-methoxyphenyl)phosphino)propane
*at 30° C. in m-cresol

We claim:

1. A process for preparing polyketones comprising contacting carbon monoxide with one or more olefins in the presence of a catalyst composition comprising:

(a) a Group VIII metal compound, containing at least one ligand capable of coordinating to the Group VIII metal and, (b) a compound of the formula BXYZ where at least one of X, Y and Z is a chloro or bromo phenyl group.

2. A process for preparing polyketones as claimed in claim 1 wherein the process is carried out in the presence of at least 4 moles of water per mole atom of boron.

3. A polyketone wherein at least 30 mole % of the end groups are chloro or bromophenyl groups.

* * * * *